United States Patent [19]

Iwata et al.

[11] Patent Number: 4,996,958
[45] Date of Patent: Mar. 5, 1991

[54] IGNITION TIMING CONTROLLING APPARATUS FOR INTERNAL COMBUSTION ENGINE

[75] Inventors: Toshio Iwata; Wataru Fukui, both of Himeji, Japan

[73] Assignee: Mitsubishi Denki Kabushiki Kaisha, Tokyo, Japan

[21] Appl. No.: 489,633

[22] Filed: Mar. 7, 1990

[30] Foreign Application Priority Data

Mar. 8, 1989 [JP]  Japan .................................. 1-53876

[51] Int. Cl.$^5$ .............................................. F02P 5/00
[52] U.S. Cl. ..................................... 123/417; 123/418
[58] Field of Search ............... 123/417, 416, 418, 422, 123/419

[56] References Cited

U.S. PATENT DOCUMENTS

| | | | |
|---|---|---|---|
| 4,625,704 | 12/1986 | Wheelock | 123/611 |
| 4,870,935 | 10/1989 | Araki | 123/417 |
| 4,944,271 | 7/1990 | Iwata et al. | 123/435 |

Primary Examiner—Raymond A. Nelli
Attorney, Agent, or Firm—Sughrue, Mion, Zinn, Macpeak and Seas

[57] ABSTRACT

An ignition timing controlling apparatus wherein ignition timing of an internal combustion engine used for driving a vehicle is controlled by calculating time required for ignition from a rotational referential position according to the target ignition timing calculated on the basis of the running state of the internal combustion engine and an average value of detected periods of the rotational referential position of the internal combustion engine, is capable of carrying out a stabilized ignition timing controlling even when the internal combustion engine creates periodic rotational variation.

9 Claims, 7 Drawing Sheets

IGNITION TIMING CONTROLLING APPARATUS FOR INTERNAL COMBUSTION ENGINE

BACKGROUND OF THE INVENTION

1. Field of the invention

The present invention relates to an ignition timing controlling apparatus for an internal combustion engine, especially to an ignition timing controlling apparatus for an internal combustion engine used for driving a vehicle or the like.

2. Description of Related Art

FIG. 1 is a block diagram showing a construction of a conventional ignition timing controlling apparatus. In the figure, reference numeral 2 is a load sensor, such as a boost sensor or the like which detects boost pressure of the inside of an intake manifold of an engine. The load sensor 2 detects the load of the engine. The load sensor 2 is connected to an input interface (hereinafter to be called input I/F) 3 together with a rotation sensor 1 which detects the number of rotations of a crank shaft (or a cam shaft) of the engine and a referential position of a rotational angle thereof (hereinafter to be called as a crank angle). The input I/F 3 is connected to a microprocessor unit (hereinafter to be called MPU) 4 through a bus. The MPU 4 is connected through a bus to a control program, a ROM 5 storing information such as target ignition timing data wherein the number of rotations and load being set as parameters, a RAM 6 storing various kinds of control information, and an output interface (hereinafter to be called output I/F) 10. The MPU 4 has a target ignition timing calculating means 7, period calculating means 8, and ignition timing calculating means 9. The target ignition timing calculating means 7 reads out the target ignition timing data stored in the ROM 8 as a parameter being the number of rotations and load which indicate the running state of the engine. The readout target ignition timing data is compensated by the other calculated data such as water temperature, thereby calculating the target ignition timing data. The period calculating means 8 calculates the detected period accordingly to the referential position detected by the rotation sensor 1. The ignition timing calculating means 9 calculates the ignition time required for the ignition from the referential position on the basis of the calculated period, detected referential position, and calculated target ignition timing data. When the rotation sensor 1 detects the referential position, the MPU 4 output an ignition signal instructing the ignition to the engine at the calculated ignition timing to the output I/F 10 through a bus.

The output I/F 10 is connected to a base of an ignition unit 11 which uses an emitter-grounded transistor. The collector of the ignition unit 11 is connected to one end of a primary coil of an ignition coil 12. The ignition coil 12 connects one end of a secondary coil to an ignition plug 13, and high voltage is applied thereto. The ignition unit 11 on-off controls the primary coil by using the ignition signal. The other end of the primary coil is batch-connected to the other end of the secondary coil and a battery being a power source through a key switch (not shown).

Next, explanation will be given on the operation of a conventional ignition timing control, by taking four-cycle four-cylinder engine as an example.

FIG. 2 is a flow chart showing the operation of a conventional ignition timing controlling apparatus shown in FIG. 1.

The conventional ignition timing controlling apparatus of an internal combustion engine is constructed as above mentioned, and obtains referential position information and number-of-rotations information of crank rotational angle from the rotation sensor 1, and obtains load information of the engine from the load sensor 2. Each information is inputted to the MPU 4 through the input I/F 3. The target ignition timing data stored in the ROM 5 is read out according to the inputted number-of-rotations information and the load information, and the target ignition timing $\theta_O$ indicated by the crank angle of the engine is obtained at the target ignition timing calculating means 7. Next, according to the control program stored in the ROM 5, and on the basis of the flow chart shown in FIG. 2, calculation to determine the ignition timing is executed at every referential position of the crank angle. At first, in Step S1, the period $T_{n-1}$ of the referential position $\theta_R$ of the last crank angle is calculated by the period calculating means 8. Next, the processing advances to Step S2, and the time $T_a = (\theta_R - \theta_O/180) \times T_{n-1}$ (in case of four cycle four-cylinder engine, referential position for ignition at every 180° is to be detected) required for the ignition from the referential position $\theta_R$ to the ignition timing $\theta_O$ is calculated at the ignition timing calculating means 9. And in Step S3, a timer inside the MPU 4 is set to the time $T_a$ at the referential position $\theta_O$. After the time $T_a$ has passed, the ignition signal is outputted through the output I/F 10. The ignition signal drives the ignition unit 11 then the transistor is turned on, thereby ignition operation of the engine is carried out.

FIG. 3 is a timing chart showing the operating waveform of each part, the operating waveform of a detecting signal of the rotation sensor 1 being shown in FIG. 3(a), and the electric current of the primary coil of the ignition coil 12 being shown in FIG. 3(b) respectively. Hereupon, the referential position $\theta_R$ is detected at the leading edge of the detecting signal, at that time the timer is set to the time $T_a$, the transistor of the ignition unit 11 is turned on after the time $T_a$ has passed, and the electric current of the ignition coil 12 to the primary coil changes rapidly to be zero, thereby inducing high voltage at the secondary coil.

FIG. 4 is a graph showing a rotation variation of the internal combustion engine, the axis of ordinate thereof showing the detection period of the rotation referential position, and the axis of abscissa showing the detecting number of the rotation referential position respectively. FIG. 5 is a graph showing variation of ignition timing, the axis of ordinate showing the ignition timing $\theta_A$, and the axis of abscissa showing the number of ignitions.

In the conventional ignition timing controlling apparatus of the internal combustion engine as above mentioned, in the case where there is a rotational variation of a cam shaft or a crank shaft of the engine, especially a rotational variation which causes, as shown in FIG. 4, large and small huntings at every rotation of period T, there is a problem that an actual ignition timing to the target ignition timing $\theta_O$ creates large huntings as shown with solid line in FIG. 5, leading the running of the engine unstabilized, because, although the small (or large) period $T_n$ of this time should be used to calculate the ignition timing, the large (or small) period $T_{n-1}$ of the last time is used in actual calculation.

SUMMARY OF THE INVENTION

The present invention has been devised to solve the problems above mentioned. The primary object of the invention is to provide an ignition timing controlling apparatus of an internal combustion engine which is capable of carrying out a stabilized ignition timing control even when the engine creates periodic rotational variation at every rotation, by controlling the ignition timing which the use of the average value of the period of the rotation referential position.

The above and further objects and features of the invention will more fully be apparent from the following detailed description with accompanying drawings.

DESCRIPTION OF THE PREFERRED EMBODIMENTS

Figure 6:
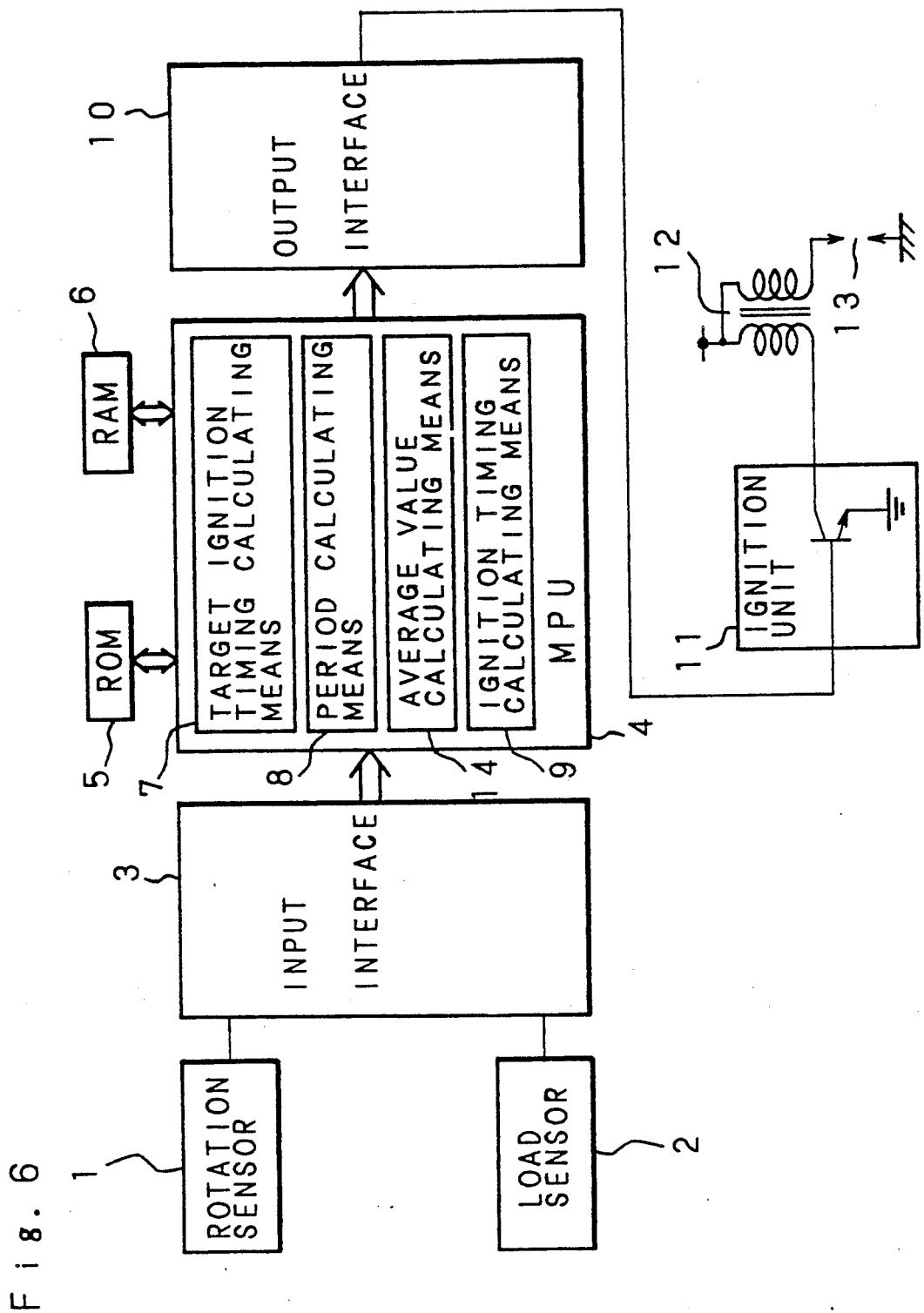
FIG. 6 is a block diagram of a construction of an ignition timing controlling apparatus of an internal combustion engine according to an embodiment of the invention.

FIG. 6 is a block diagram showing a construction of an ignition timing controlling apparatus according to the present invention. In the figure, reference numeral 2 is a load sensor, such as a boost sensor or the like which detects boost pressure of the inside of an intake manifold of an engine. The load sensor 2 detects the load of the engine. The load sensor 2 is connected to an input interface (hereinafter to be called input I/F) 3 together with a rotation sensor 1 which detects the number of rotations of a crank shaft (or a cam shaft) of the engine and a referential position of a rotational angle thereof (hereinafter to be called as a crank angle). The input I/F 3 is connected to a microprocessor unit (hereinafter to be called MPU) 4 through a bus. The MPU 4 is connected through a bus to a control program, a ROM 5 storing information such as target ignition timing data wherein the number of rotations and load being set as parameters, a RAM 6 storing various kinds of control information, and an output interface (hereinafter to be called output I/F) 10. The MPU 4 has a target ignition timing calculating means 7, period calculating means 8, an average value calculating means 14 and ignition timing calculating means 9. The target ignition timing calculating means 7 reads out the target ignition timing data stored in the ROM 5 as parameters being the number of rotations and load which indicate the running state of the engine. The read-out target ignition timing data is compensated by the other data such as water temperature, thereby calculating the target ignition timing. The period calculating means 8 calculates the detected period according to the referential position detected by the rotation sensor 1. The average value calculating means 14 calculates the average value of the detected period and the period detected at the last timing. The ignition timing calculating means 9 calculates the ignition time required for ignition from the referential position on the basis of the calculated average value, the detected rotation referential position and the calculated target ignition timing. When the rotation sensor 1 detects the referential position, the MPU 4 outputs an ignition signal which instructs to ignite the engine at the calculated ignition timing to the output I/F 10 through a bus.

The output I/F 10 is connected to a base of an ignition unit 11 which uses an emitter-grounded transistor. The collector of the ignition unit 11 is connected to one end of a primary coil of an ignition coil 12. The ignition coil 12 connects one end of a secondary coil to an ignition plug 13, applying high voltage thereto. The ignition unit 11 on/off-controls the electric current to the primary coil by using the ignition signal. The other end of the primary coil is batch-connected to the other end of the secondary coil and a battery being a power source through a key switch (not shown).

Hereinafter, explanation will be given on operation of the ignition timing controlling apparatus of the invention as above constructed, taking four-cylinder engine as an example.

FIG. 6 is a flow chart showing process contents of ignition timing calculation.

The ignition timing controlling apparatus of internal combustion engine of the invention is constructed as above, obtaining the referential position information of the crank rotational angle and the number-of-rotations information of the crank shaft from the rotation sensor 1, also obtaining the load information of the engine from the load sensor 2. The aforementioned each information is inputted to the MPU 4 through the input I/F 3. The target ignition timing data stored in the ROM 5 is read out according to the inputted number-or-rotations information and the load information, then the target ignition timing $\theta_O$ is obtained at the target ignition timing calculating means 7. Next, according to the control program stored in the ROM 5, and on the basis of the flow chart shown in FIG. 7, calculation for determining the ignition timing at every referential position of the crank angle is executed. At first, in Step S1, the period $T_{n-1}$ of the last crank angle referential position $\theta_R$ is calculated at the period calculating means 8. Next, processing advances to Step S4, wherein the average value $T - (T_{n-1} + T_{n-2})/2$ is calculated by using the last period $T_{n-1}$ and the last but one period $T_{n-2}$ at the average value calculating means 14. Next, processing advances to Step S2, wherein the time, from the crank angle referential position $\theta_R$ to the ignition timing $\theta_O$, $T_a = ((\theta_R - \theta_O)/180)) \times T$ (here, 180 is used in the case of four-cylinder engine) is calculated at the ignition timing calculating means 9 by using the average period T which has been obtained in Step S4. And in Step S3, a timer in the MPU 4 is set to time $T_a$ at the referential position $\theta_R$. Next, in Step S5, the last period $T_{n-1}$ is replaced by the last but one period $T_{n-2}$ which is to be used in the next calculation.

Figure 1:
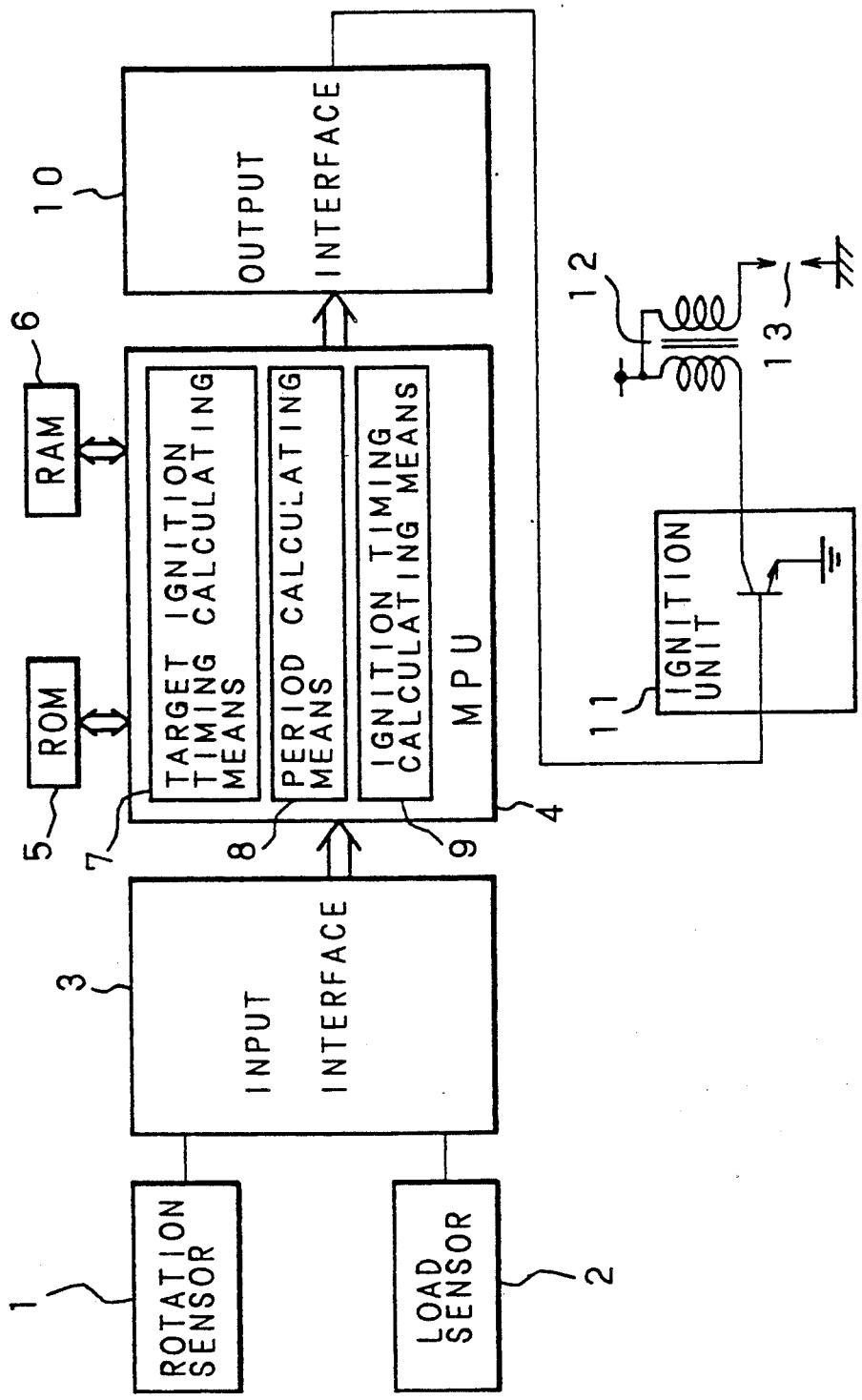
FIG. 1 is a block diagram of the construction of a conventional ignition timing controlling apparatus of an internal combustion engine.
Figure 2:
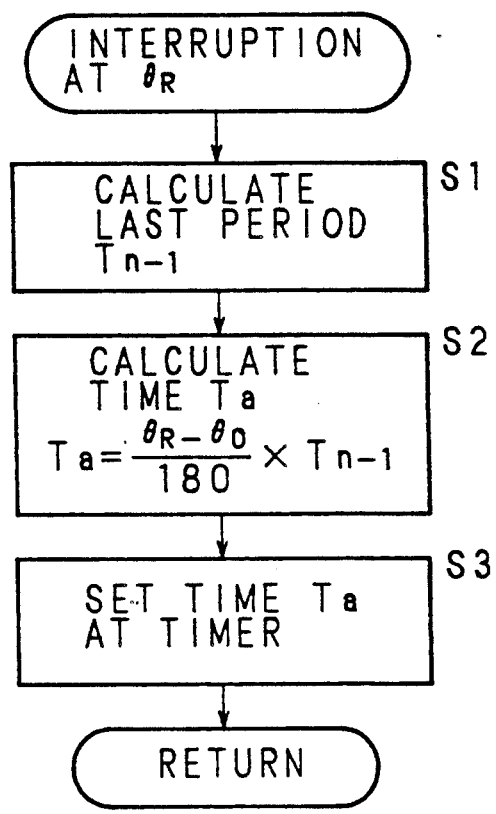
FIG. 2 is a flow chart of conventional ignition timing calculation.
Figure 3:
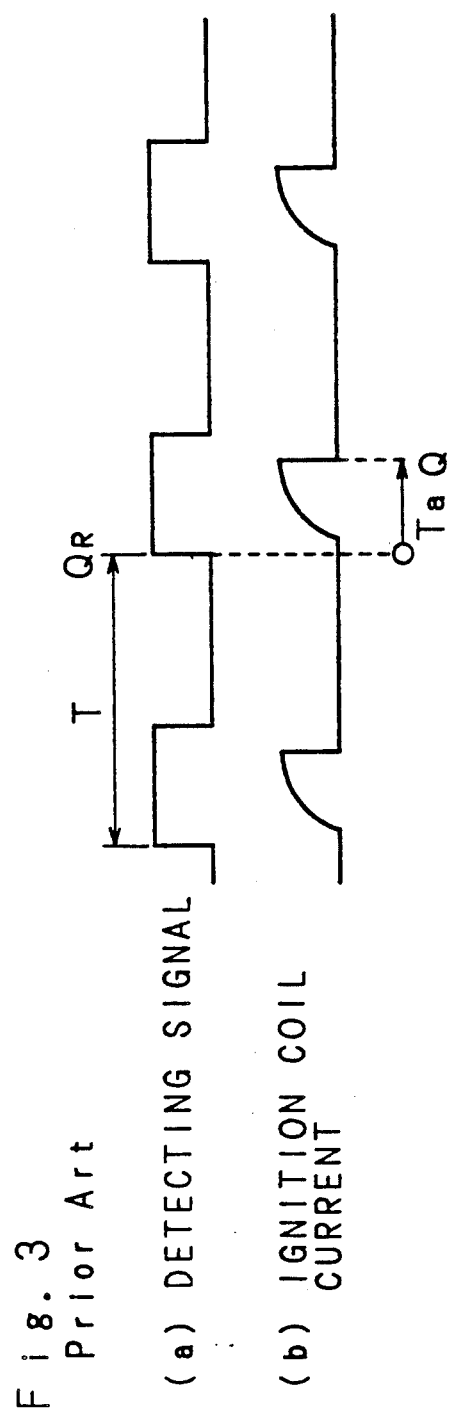
FIG. 3 is a waveform drawing of operation of the apparatus shown in FIG. 1.
Figure 4:
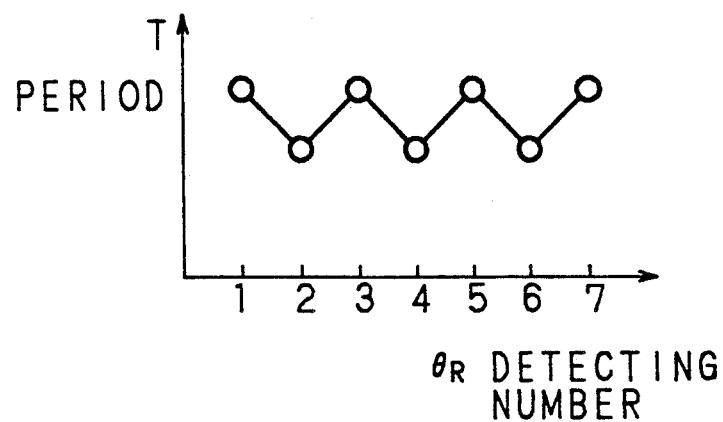
FIG. 4 is a graph showing a relationship between the period T and the referential position $\theta_R$ of the crank angle.
Figure 5:
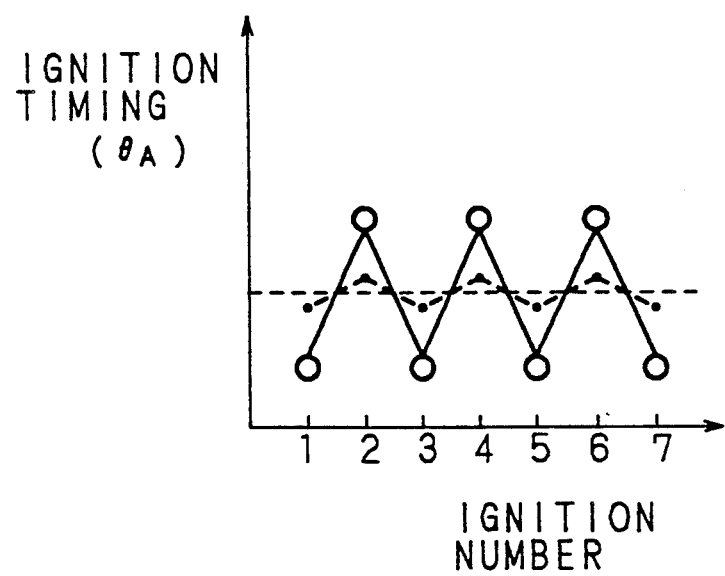
FIG. 5 is a graph showing a relationship between the number of ignitions and the ignition timing.

As described above, by calculating the ignition timing with the use of the average value T of the last period $T_{n-1}$ and the last but one period $T_{n-2}$, the ignition timing $\theta_A$ is controlled to be relatively stabilized value as shown in broken line of FIG. 5, even when the period T creates hunting every time as shown in FIG. 4.

Next, explanation will be given on another embodiment of the invention.

Figure 7:
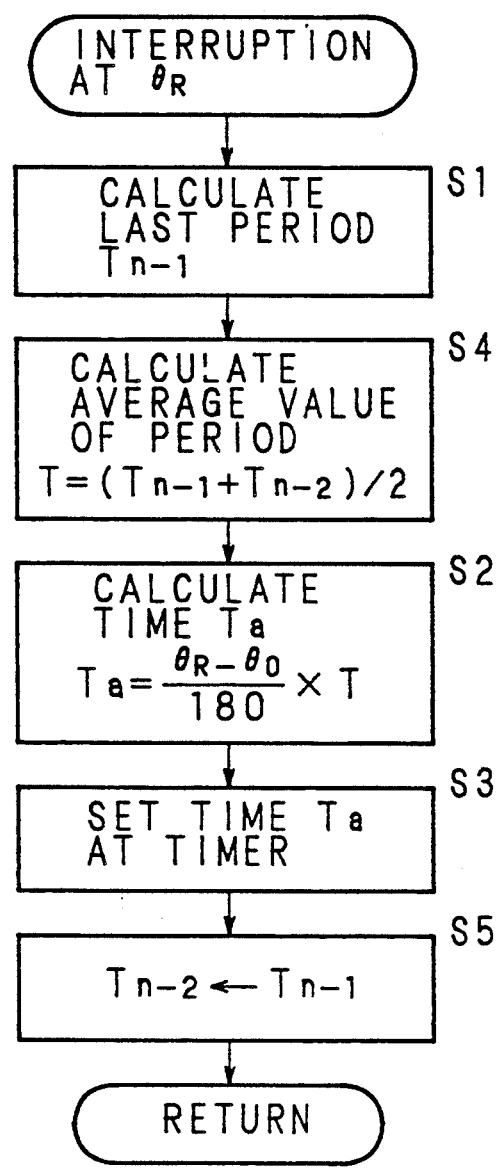
FIG. 7 is a flow chart of ignition timing calculation according to an embodiment of the invention.
Figure 8:
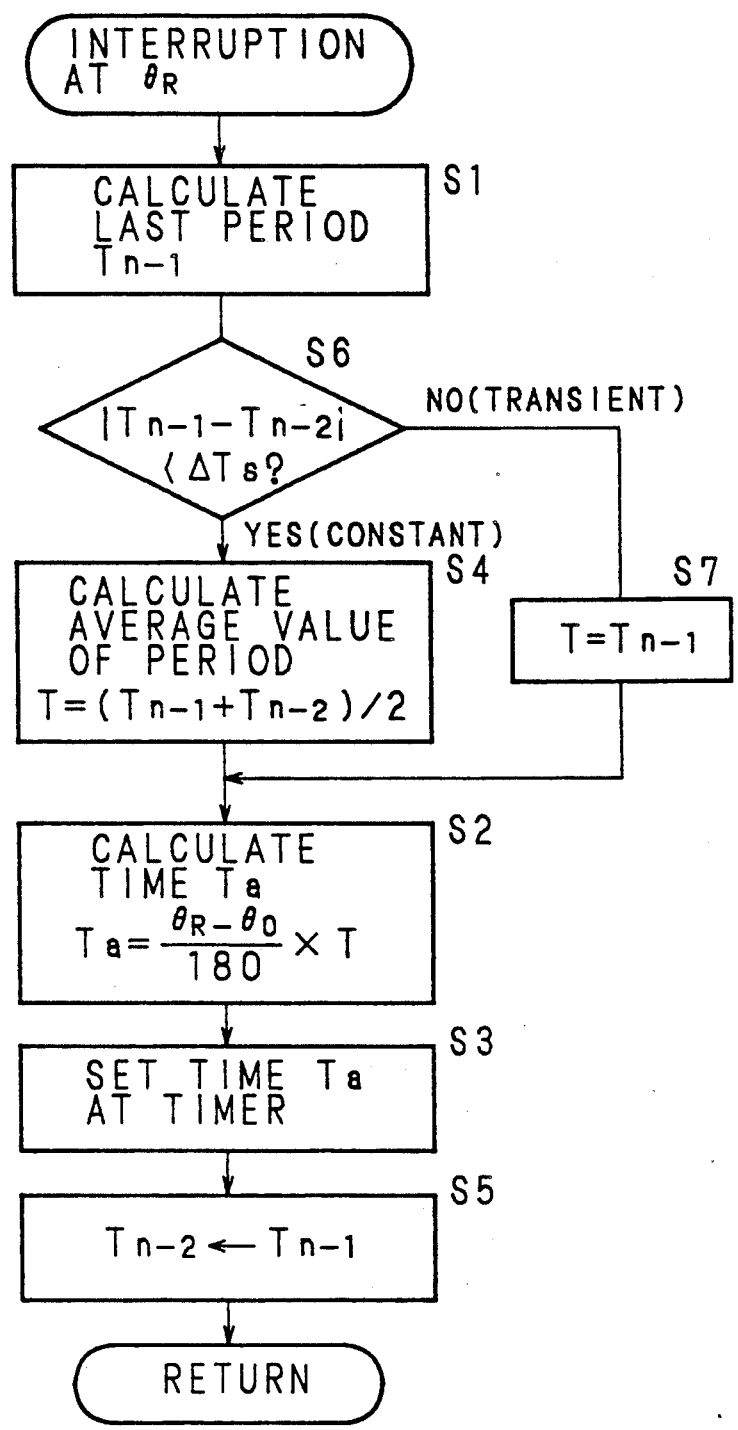
FIG. 8 is a flow chart of ignition timing calculation according to another embodiment of the invention.

FIG. 7 is a flow chart of ignition timing calculation wherein ignition timing calculation according to aforementioned averaging is executed only at the time of normal running of the engine, and the conventional calculation is employed at the time of transitional running such as accelerating and decelerating. When compared with FIG. 6, Step S6 and Step S7 are newly added to FIG. 7. In Step S6, the difference between the last period $T_{n-1}$ and the last but one period $T_{n-2}$ is compared with the predetermined value $\Delta T_S$. When the difference is smaller than $\Delta T_S$, the engine is judged to be in the state of normal running, and the processing advances to Step S4 to execute the ignition timing calculation according to the aforesaid averaging of periods. When the difference is equal to or larger than $\Delta T_S$, the engine is judged to be in the state of transitional running, the processing advances to Step S7 to execute the ignition timing calculation in the same way as the conventional. According to the way above mentioned, lowering of response due to averaging at the transitional time can be prevented.

In addition, in the emobodiment above mentioned, averaging of the last period $T_{n-1}$ and the last but one period $T_{n-2}$ is carried out, but averaging of more than two periods as the following formula is also acceptable. The process of averaging in this case is moving average calculation.

$$T=(T_{n-1}+T_{n-2}+\ldots +T_{n-k})/K$$

As explained above, the ignition timing controlling apparatus of the invention is provided with detecting means for detecting rotation referential position of the engine, target ignition timing calculating means for calculating the target ignition timing on the basis of the running state of the engine, period calculating means for calculating the period of the predetermined rotation referential position interval according to aforesaid detecting means, ignition timing calculating means for calculating the ignition timing on the basis of the period data obtained by the period calculating means and calculated data obtained by aforesaid target ignition timing calculating means, and average value calculating means for calculating average value of values of at least two sections of the period calculation result at every predetermined rotation referential position of aforesaid engine, and is capable of carrying out a stabilized ignition timing control even when the engine creates periodic variation at every rotation, since aforesaid average value calculated at aforesaid average value calculating means is made to be aforesaid period data.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An ignition timing controlling apparatus for an internal combustion engine comprising:
   target ignition timing calculating means for calculating target ignition timing on the basis of the running state of said internal combustion engine;
   detecting means for detecting timing when a rotating part of said internal combustion engine passes a reference position of said internal combustion engine;
   period calculating means for calculating a period which is the interval between adjacent timings detected by said detecting means;
   average value calculating means for calculating an average value of calculated periods; and
   ignition timing calculating means for calculating ignition timing on the basis of said average value and said target ignition timing.

2. An ignition timing controlling apparatus as set forth in claim 1, wherein said detecting means includes a rotational angle sensor which detects the rotational angle of a rotating component of said internal combustion engine.

3. An ignition timing controlling apparatus as set forth in claim 2, wherein said rotating component is a crank shaft of said internal combustion engine.

4. An ignition timing controlling apparatus as set forth in claim 2, wherein said rotating component is a cam shaft of said internal combustion engine.

5. An ignition timing controlling apparatus as set forth in claim 2, further comprising load detecting means for detecting load of said internal combustion engine, said target ignition timing calculating means determining the running state of said internal combustion engine by calculation on the basis of detected signals of said laod detecting means and rotational angle sensor.

6. An ignition timing controlling apparatus as set forth in claim 1, wherein said target ignition timing is indicated by the rotational angle of a rotating component of said internal combustion engine.

7. An ignition timing controlling apparatus as set forth in claim 1, wherein said average value calculating means obtains the average value by moving average calculation of said periods.

8. An ignition timing controlling apparatus as set forth in claim 2, wherein said ignition timing calculating means calculates time from said reference position to ignition position by executing a predetermined calculation on the basis of said target ignition timing, reference position and average value, and output an ignition signal when the calculated time has past.

9. An ignition timing controlling apparatus as set forth in claim 1, wherein said ignition timing calculating means calculates the ignition timing on the basis of a lastly calculated period when a veriation of said period is larger than a predetermined value.

* * * * *